US009734598B2

(12) United States Patent
Grossman

(10) Patent No.: US 9,734,598 B2
(45) Date of Patent: Aug. 15, 2017

(54) ENGINE FOR STREAMING VIRTUAL TEXTURES

(71) Applicant: Microsoft Corporation, Redmond, WA (US)

(72) Inventor: Mark Grossman, Palo Alto, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 516 days.

(21) Appl. No.: 13/741,735

(22) Filed: Jan. 15, 2013

(65) Prior Publication Data
US 2014/0198122 A1 Jul. 17, 2014

(51) Int. Cl.
G06T 11/00 (2006.01)
G06T 9/00 (2006.01)

(52) U.S. Cl.
CPC ............ *G06T 11/001* (2013.01); *G06T 9/00* (2013.01)

(58) Field of Classification Search
CPC .......... G06T 15/005; G06T 9/00; G06T 9/005
See application file for complete search history.

(56) References Cited

U.S. PATENT DOCUMENTS

| | | | |
|---|---|---|---|
| 6,108,460 A | 8/2000 | Rich | |
| 6,243,081 B1 | 6/2001 | Goris et al. | |
| 6,448,973 B1 | 9/2002 | Guo et al. | |
| 6,452,602 B1 | 9/2002 | Morein | |
| 6,618,053 B1* | 9/2003 | Tanner | G06T 15/04 345/552 |
| 6,768,493 B1* | 7/2004 | Donovan | 345/583 |
| 6,778,181 B1* | 8/2004 | Kilgariff | G06T 15/005 345/582 |
| 7,164,426 B1* | 1/2007 | Duluk, Jr. | G06T 1/60 345/552 |

(Continued)

FOREIGN PATENT DOCUMENTS

| | | |
|---|---|---|
| EP | 0981107 A1 | 2/2000 |
| WO | 2012/174231 A1 | 12/2012 |

OTHER PUBLICATIONS

Obert, et al., "Virtual Texturing in Software and Hardware", In Proceedings of International Conference on Computer Graphics and Interactive Techniques, Aug. 5, 2012, 29 pages.

(Continued)

Primary Examiner — Jacinta M Crawford
Assistant Examiner — Jitesh Patel
(74) Attorney, Agent, or Firm — Vierra Magen Marcus LLP

(57) ABSTRACT

An engine decompresses texture data belonging to a virtual texture stored in processor readable memory so that decompressed texture data may be used to update a selected sub-image of a large texture image used to render a CGI. The updated sub-image may be at any location in the larger texture image. A processor executes an application to provide control information to the engine. The control information may include commands to decode compressed texture data at source addresses and provide a stream of decompressed virtual texture data to selected sub-image destination addresses in a texture buffer used for rendering a CGI. Similarly, the engine may compress texture sub-image information and store the compressed result at a destination address.

20 Claims, 7 Drawing Sheets

(56) References Cited

U.S. PATENT DOCUMENTS

| | | | |
|---|---|---|---|
| 7,518,616 B1 | 4/2009 | Edwards | |
| 7,626,591 B2 | 12/2009 | Crawfis et al. | |
| 7,710,424 B1* | 5/2010 | Hutchins | G09G 5/363 345/537 |
| 7,710,425 B1* | 5/2010 | Baldwin | G06T 1/60 345/538 |
| 7,796,823 B1* | 9/2010 | Budagavi | 382/232 |
| 7,884,830 B1* | 2/2011 | Green et al. | 345/582 |
| 8,019,151 B2 | 9/2011 | Beilloin | |
| 8,233,006 B2 | 7/2012 | Grossman et al. | |
| 2008/0055331 A1* | 3/2008 | Iourcha et al. | 345/582 |
| 2008/0303841 A1* | 12/2008 | Newhall, Jr. | G06T 1/60 345/587 |
| 2010/0060640 A1* | 3/2010 | Melikian | G06T 15/20 345/427 |
| 2011/0075943 A1 | 3/2011 | Minami | |
| 2011/0115806 A1* | 5/2011 | Rogers | 345/582 |
| 2011/0169850 A1* | 7/2011 | Donovan et al. | 345/552 |
| 2012/0194504 A1* | 8/2012 | McCloskey | G06K 9/00268 345/419 |
| 2012/0320067 A1* | 12/2012 | Iourcha et al. | 345/501 |

OTHER PUBLICATIONS

Hollemeersch, et al., "Accelerating Virtual Texturing Using CUDA", Retrieved on: Oct. 19, 2012, Available at: http://aaronm.nuclearglory.com/vt/AcceleratingVirtualTexturingUsingCUDA-b10648-49.pdf.

Cornell University, "A brief How-To for Virtual Textures", Oct. 19, 2012, 14 pages.

"International Search Report & Written Opinion for PCT Patent Application No. PCT/US2014/011363", Mailed Date: Jul. 1, 2014, Filed Date: Jan. 14, 2014, 11 Pages.

PCT Demand for International Preliminary Examination and Response to Written Opinion of the International Search Report filed Sep. 19, 2014 in International Patent Application No. PCT/US2014/011363.

Written Opinion dated Mar. 9, 2015 in International Patent Application No. PCT/US2014/01363.

International Preliminary Report on Patentability dated May 11, 2015 in International Patent Application No. PCT/US2014/011363.

* cited by examiner

ENGINE FOR STREAMING VIRTUAL TEXTURES

BACKGROUND

Texture mapping is a method for adding detail, surface texture or color to a computer-generated image (CGI). A texture map is applied (mapped) to the surface of a shape or polygon. This process is similar to applying patterned paper to a plain white box.

Virtual texturing refers to a texturing method in which the physical memory pool available for texture storage is less than the total amount of texture that is potentially useable to produce a CGI. When rendering using a virtual texture, typically only portions of the virtual texture or lower-detail versions thereof are made available to an active texture pool for rendering.

SUMMARY

An engine decompresses texture data belonging to a virtual texture stored in processor readable memory so that decompressed texture data may be used to update a selected sub-image of a large texture image used to render a CGI. The updated sub-image may be at any location in the larger texture image. A processor executes an application to provide control information to the engine. The control information may include commands to decode compressed texture data at source addresses and provide a stream of decompressed virtual texture data to selected sub-image destination addresses in a texture buffer used for rendering a CGI. In embodiments, the engine may decompress lossy and lossless compressed texture data. For example, stored compressed texture data may be Joint Photographic Experts Group (JPEG) compressed texture data or Lempel-Ziv 77 (LZ77) compressed texture data.

The engine may include at least an integrated circuit having a controller, read/write buffers and LZ and/or JPEG decoders. In an embodiment, the engine may also have LZ and/or JPEG encoders to compress texture data. The engine may be included in a computing device having at least one processor and volatile memory in a system on a chip (SoC). In an embodiment, the at least one processor may be a graphics processor and/or central processor.

The application may be a video game software application and the computing device may be a video game console. In alternate embodiments, the computing device may be included in at least a cell phone, mobile device, embedded system, media console, laptop computer, desktop computer, server and/or datacenter.

A method embodiment includes operating an engine to decompress encoded texture information stored on processor readable memory. A control signal is received to initiate decompression of the compressed texture information. A start address of the compressed texture information and a destination address of a sub-rectangle image is also received. The compressed texture information is decoded to provide texture information that is output to the sub-rectangle image.

An apparatus embodiment includes at least one rendering processor that executes processor readable instructions to render a CGI using a texture image having a plurality of texture sub-images. At least one processor readable memory store compressed data representing texture of at least a first texture sub-image in the plurality of sub-images. An engine receives at least one command to decompress the compressed data representing a texture sub-image. The engine then stores the decompressed data representing the texture sub-image in the at least one processor readable memory. The at least one processor then uses the decompressed data representing texture in rendering a CGI by using the first texture sub-image in the plurality of sub-images. The engine may also decompress an entire texture image in an embodiment.

In another embodiment, at least one processor readable memory includes instructions which when executed cause the at least one processor to perform a method for decompressing compressed texture data. Memory space for an active texture pool is allocated. A determination of a sub-image area and detail level to be rendered is made. At least one command is transferred to an engine to decompress compressed texture data to texture data for the sub-image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In order to facilitate updating arbitrarily selected portions of a very large image, such as a CGI, an engine decompresses compressed texture data and writes the decompressed texture data to a sub-image address in memory. The texture data may be JPEG and/or LZ compressed texture data, which itself may be either block coded or unencoded, and which may comprise color or depth values, or other types of values stored as a two-dimensional array. The engine accepts control information in the form of a command stream to decompress the compressed texture data. The engine then decompresses the selected compressed texture and writes the decompressed texture data to a texture buffer. Hardware, such as a graphics processor unit (GPU) along with an application, such as a video game, and other rendering software render the decompressed texture data at the selected portion of the CGI. The engine may also compress and store texture data at selected addresses in memory.

Figure 1:
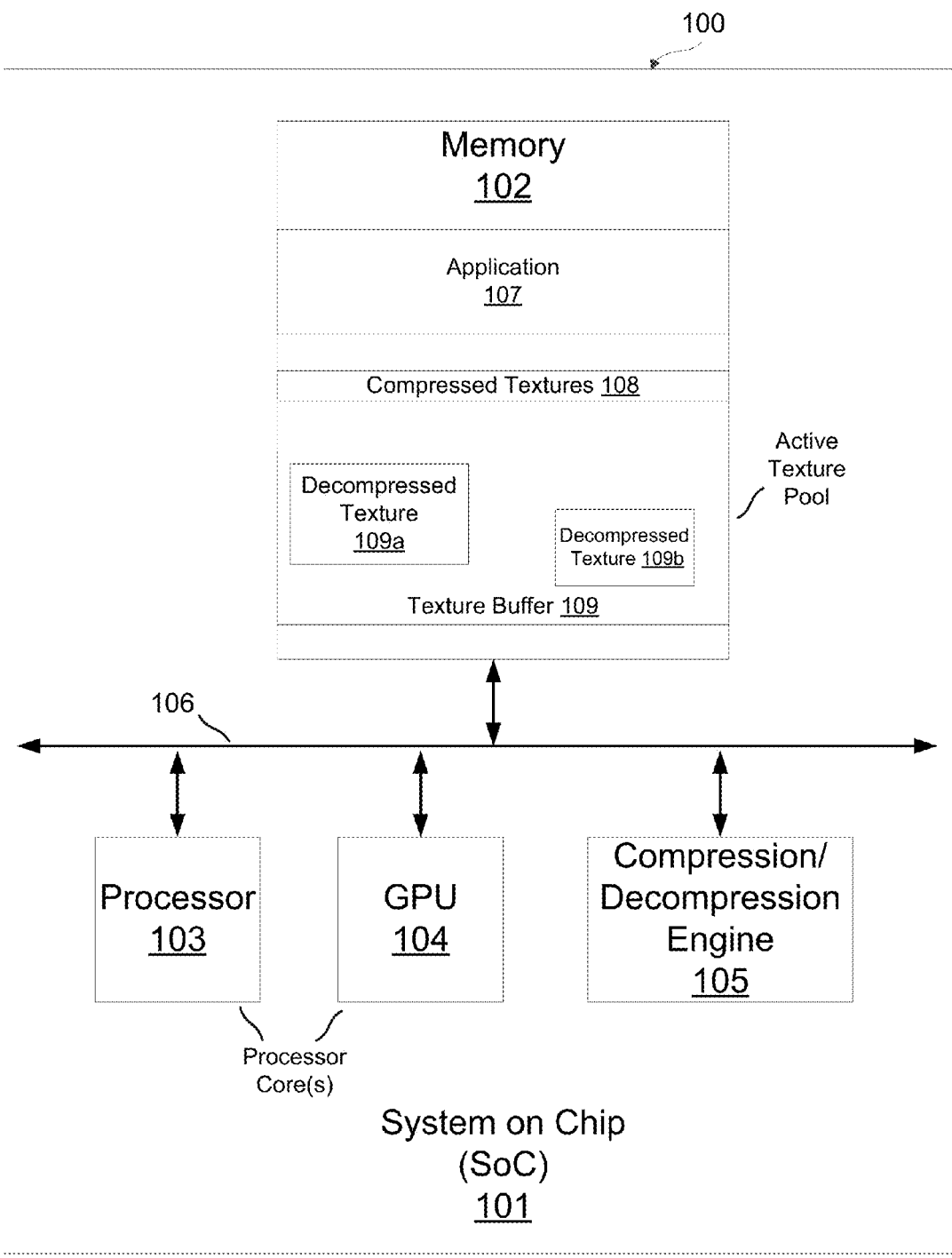
FIG. 1 is a high-level block diagram of an exemplary hardware architecture of a computing device having an engine for decompressing compressed textures.

FIG. 1 is a high-level block diagram of exemplary hardware architecture of a computing device 100 having an engine for streaming decompressed textures. In an embodiment, computing device 100 includes a compression/decompression engine (engine) 105, memory 102, and processor core(s) that may include CPU 103 and/or GPU 104 that communicate by way of signal path 106. Memory 102 includes processor readable memory to store application 107 (such as a video game), compressed textures 108 and decompressed textures 109a/b in texture buffer 109 (or active texture pool). In an embodiment, GPU 104 in response to application 107, compressed textures 108, engine 105 and texture buffer 109 renders at least one CGI using a predetermined virtual texture to a display.

Rendering is the process of generating a CGI from a 3D model (or models in what collectively could be called a scene file), by means of executing processor readable instructions in a software program. A scene file typically contains objects in a strictly defined language or data structure; a scene file would typically contain geometry, viewpoint, texture, lighting, and shading information as a description of the virtual scene. The data contained in the scene file is then passed to a rendering software program to be processed and output to a digital image or raster graphics image file that is used to display the at least one CGI.

Texture buffer 109, in memory 102, stores an active texture pool, such as decompressed textures 109a/b. In an embodiment, a texture pool is composed of some predetermined number of physical sub-allocation chunks or pages (e.g. 64 K bytes) of texture data. For example, a 256×256 sub-texture with each texel being 4 bytes would consume exactly four 64 KB pages. Hardware, such as a GPU 104, marks each virtual page of the full texture to be either a) invalid or b) valid and mapped to an arbitrarily placed physical page within the active texture pool via a page mapping method. A validity map may be stored in memory 102 and accessible by GPU 104 in embodiments.

A GPU is typically an integrated circuit able to assist a processor, such as CPU, in performing complex rendering calculations. The rendering software program executed by the GPU solves rendering equations that enable the CGIs to look relatively realistic and predictable under virtual lighting. In an embodiment, at least one rendering program includes processor readable instructions that are stored in memory 102 and executed by GPU 104.

In an embodiment, computing device 100 is included in a video game and/or media console and application 107 is a video game software application that includes processor readable instructions when executed by at least one processor provide a video game to a display for a user. In alternate embodiments, computing device 100 may be included in at least a cell phone, mobile device, embedded system, media console, laptop computer, desktop computer, server and/or datacenter.

In an embodiment, computing device 100 includes a System on a Chip (SoC a.k.a. SOC) 101 as illustrated in FIG. 1. An SoC is an integrated circuit IC that integrates components of a computing device or other electronic system into a single chip or semiconductor substrate. In an embodiment, SoC 101 includes engine 105, memory 102, and CPU 103, GPU 104 and signal path 106. In alternate embodiment, CPU 103 and GPU 104 may be replaced with a single processor core. Alternatively, other processor cores may be included in SoC 101. In an alternate embodiment, a SoC is not used.

As one of ordinary skill in the art would appreciate, other electronic components may also be included in SoC 101. A SoC 101 may include digital, analog, mixed-signal, and/or radio frequency circuits—on a single semiconductor substrate. A SoC 101 may include oscillators, phase-locked loops, counter-timers, real-time timers, power-on reset generators, external interfaces (for example, Universal Serial Bus (USB), IEEE 1394 interface (FireWire), Ethernet, Universal Asynchronous Receiver/Transmitter (USART) and Serial Peripheral Bus (SPI)), analog interfaces, voltage regulators and/or power management circuits.

In alternate embodiments, SoC 101 may be replaced with a system in package (SiP) or package on package (PoP). In a SiP, multiple chips or semiconductor substrates are housed in a single package. In a SiP embodiment, processor core(s) would be on one semiconductor substrate and memory 102 would be on a second semiconductor substrate, both housed in a single package. In an embodiment, the first semiconductor substrate would be coupled to the second semiconductor substrate by wire bonding.

In a PoP embodiment, processor core(s) would be on one semiconductor substrate housed in a first package and memory 102 would be on a second semiconductor substrate housed in a second different package. The first and second packages could then be stacked with a standard interface to route signals between the packages, in particular the semiconductor substrates. The stacked packages then may be coupled to a printed circuit board. In an embodiment, memory 102 is positioned on top of processor core(s).

In embodiments, processor core(s) includes at least one processor that executes (or reads) processor (or machine) readable instructions, such as application 107, stored in memory 102. Processor core(s) use memory 102 in response to executing processor readable instructions of application 107 to provide a CGI incorporating virtual textures. Processor core(s) may also include a controller, central processing unit (CPU), GPU, digital signal processor (DSP) and/or a field programmable gate array (FPGA).

In an embodiment, memory 102 may represent at least one processor readable memory. In an embodiment, memory 102 may be a Wide I/O DRAM. Alternatively, memory 102 may be Low Power Double Data Rate 3 dynamic random access memory (LPDDR3 DRAM) memory (also known as Low Power DDR, mobile DDR (MDDR) or mDDR). In an embodiment, memory 102 may be a combination of different types of memory. In an embodiment, compressed textures 108 are stored in a first processor readable volatile or non-volatile memory that may be larger, slower, and less expensive, and decompressed textures 109a/b are stored in a different second processor readable memory, preferably volatile, that may be smaller and faster.

In embodiments, memory 102 includes at least one array of memory cells in an IC disposed on a semiconductor substrate. In an embodiment, memory 102 is included in an integrated monolithic circuit housed in a separately packaged device than the processor core(s) and engine 105. In embodiments, memory 102 may include volatile and/or non-volatile memory.

Types of volatile memory include at least dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

Types of non-volatile memory include at least types of electrically erasable program read-only memory ("EEPROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

In embodiments, signal path 106 (as well as other signal paths described herein) are media that transfers a signal, such as an interconnect, conducting element, contact, pin, region in a semiconductor substrate, wire, metal trace/signal line, or photoelectric conductor, singly or in combination. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines to carry control and data information as well as timing information. In an alternate embodiment, a signal path includes data signal lines or control signal lines. In still other embodiments, signal paths are unidirectional (signals that travel in one direction) or bidirectional (signals that travel in two directions) or combinations of both unidirectional signal lines and bidirectional signal lines. When multiple memory arrays are used in the embodiment, multiple signal paths 106 may be used.

Figure 2:
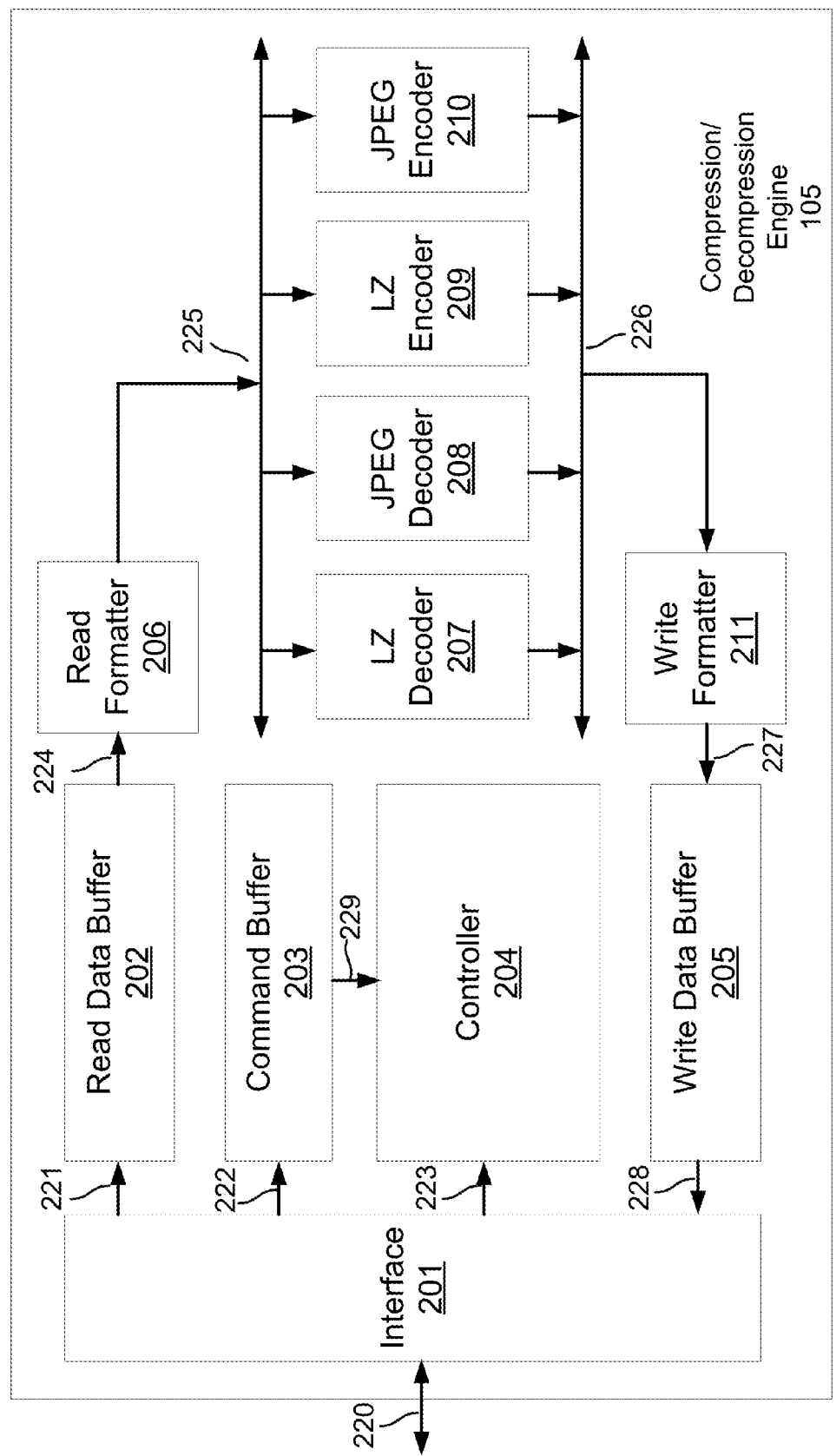
FIG. 2 is a high-level block diagram of an exemplary compression/decompression engine.

FIG. 2 is a high-level block diagram of an exemplary engine 105 illustrated in FIG. 1. In an embodiment, engine 105 functions generally as a direct memory access (DMA) controller and at least one type of decoder to provide a stream of decompressed textures to a texture buffer 109 for rendering or access by GPU 104 executing a rendering program having processor readable instructions. In an embodiment, engine 105 may also include at least one type of encoder to compress data to allow efficient storage and transmission of sub-rectangle portions of CGIs or other data generated by the system.

A DMA controller typically allows a particular hardware subsystem within a computing device to access memory independently of a CPU, GPU or other processor. Without a DMA controller, when a CPU is using programmed input/output, the CPU is typically fully occupied for the entire duration of the read or write operation, and is thus unavailable to perform other work. With a DMA controller, the CPU typically initiates the transfer, does other operations while the transfer is in progress, and receives an interrupt from the DMA controller when the operation is done. This function is useful any time the CPU cannot keep up with the rate of data transfer, or where the CPU needs to perform useful work while waiting for a relatively slow I/O data transfer. Computing devices that have a DMA controller can transfer data to and from components with much less CPU overhead than computing devices without a DMA controller. Similarly, a processing core having a DMA controller function inside a multi-core processor can transfer data to and from its local memory without occupying its processor time, allowing computation and data transfer to proceed in parallel.

A DMA controller can also be used for "memory to memory" copying or moving of data within memory. A DMA controller can offload expensive memory operations, such as large copies or scatter-gathering operations, from the CPU to a DMA controller.

In an embodiment, CPU 103 and/or GPU 104 execute at least processor readable instructions of application 107 (as shown in FIG. 1) to generate control information on signal path 220 (that corresponds to signal path 106) to engine 105. In an embodiment, the control information directs engine 105 to retrieve compressed textures 108, decode compressed textures 108 representing portions of at least one decompressed texture 109a/b and write the decompressed textures to a selected sub-rectangle addresses in texture buffer 109. GPU 104 then uses the decompressed textures stored at a selected sub-rectangle address in texture buffer 109 to render a CGI using the decompressed texture in the next frame of video in an embodiment.

Figure 3:
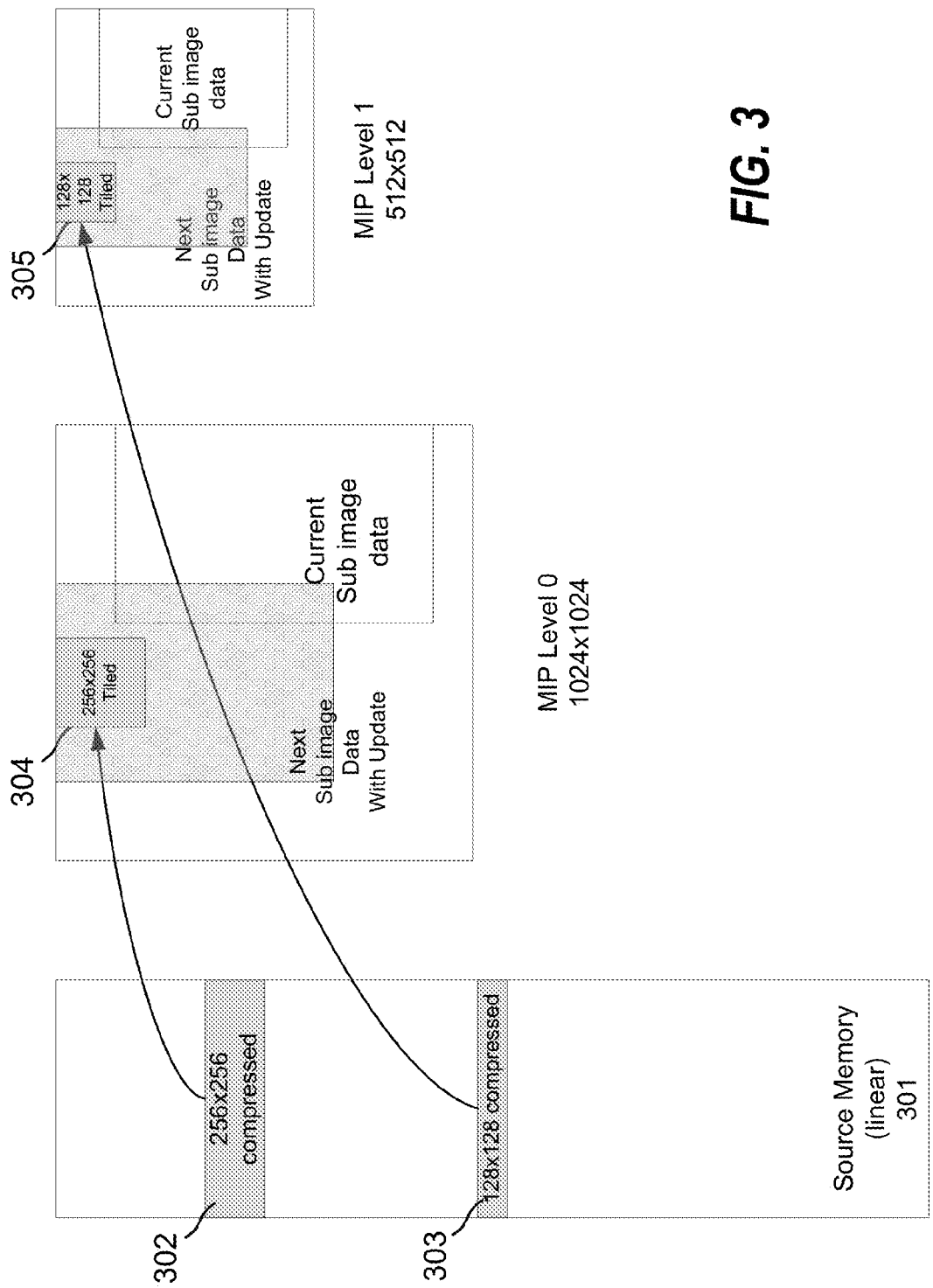
FIG. 3 illustrates mapping compressed textures stored in source memory to different sized texture sub-images.

For example, FIG. 3 illustrates mapping compressed textures stored in source memory to differently sized texture sub-images of a larger texture used in rendering a CGI. In particular, FIG. 3 illustrates retrieving compressed texture sub-images 302 and 303 from a source (linear) memory 301 and writing the decompressed texture sub-images 304 and 305 to different sized regions within two texture images that will be rendered in the next update or frame of video. In an embodiment, compressed texture sub-images 302 and 303 correspond to compressed textures 108 in memory 102 and decompressed texture sub-images 304 and 305 correspond to decompressed textures 109a/b in embodiments. Compressed texture sub-image 302 provides a 256×256 sub-image stored in a tile format for a Mip Level 0 (1024×1024) while compressed texture sub-image 303 provides a 128×128 sub-image stored in a tile format for a Mip Level 1 (512×512).

Mipmaps (a.k.a MIP maps or mip maps) are pre-filtered, optimized collections or sets of images that accompany a main full-resolution texture or image, intended to increase rendering speed and reduce aliasing artifacts in an embodiment. Each image of the mipmap set is a version of the main texture, but at a certain reduced level of detail. A scale difference between images in the mipmap set is known as a MIP level. For example, a main texture would have a MIP level 0 indicating the image has the most detail, a MIP level 1 would indicate a mipmap image that has less detail than the main texture at MIP level 0, and so on. Although the main texture would still be used when the view is sufficient to render the main texture in full detail, render mechanisms will switch to a suitable mipmap image when the texture is viewed from a distance or at a small size. Rendering speed increases since the number of texture pixels (texels) being processed can be much lower than with simple textures. In an embodiment, compressed textures 108 include at least one texture mipmap.

If a main texture has a size of 1024×1024 pixels, then the associated mipmap set may contain a series of 10 images, each one-fourth the total area of the previous one: 1024×1024 pixels (Mip Level 0), 256×256 (Mip Level 1), 128×128 (Mip Level 2), 64×64 (Mip Level 3), 32×32 (Mip Level 4), 16×16 (Mip Level 5), 8×8 (Mip Level 6), 4×4 (Mip Level 7), 2×2 (Mip Level 8 ), 1×1 (Mip Level 9) (a single pixel). If, for example, a scene is rendering this texture in a space of 40×40 pixels, then either a scaled up version of the 32×32 (without trilinear interpolation in an embodiment) or an interpolation of the 64×64 and the 32×32 mipmaps (with trilinear interpolation in an embodiment) may be used. A mipmap set may be generated by successive averaging in an embodiment. In alternate embodiments, other methods can also be used to create a mipmap set.

Returning to FIG. 2, read data (such as compressed textures 108), write data (such as decompressed textures 109a/b) and control information are transferred to and from engine 105 on signal path 220. Signal path 220 may include multiple signal paths to carry multiple bits of information in parallel and/or serially. Signal path 120 may also provide timing or clock information to and from engine 105. Timing or clock information may synchronize the reception or transfer of data from and to engine 105. In an embodiment, signal path 120 corresponds to signal path 106 shown in FIG. 1.

The control information may include at least one command and control value to decompress compressed texture data at source addresses and provide a stream of decompressed texture data to destination addresses in a texture buffer used for rendering using selected sub-images. The control information is provided so that engine 105 may fetch compressed texture data, decompress the compressed texture data, and transfer the decompress texture data to a texture buffer in a selected appropriate format.

In an embodiment, the control information is provided in the form of a command packet that includes a command value or code representing a command for engine 105 to perform and at least one associated control value (for examples source and destination addresses). In an embodiment, control information is provided in successive fields or multi-bit positions in the command packet. In an embodiment, at least one processor executes application 107 to output at least one command packet to engine 105 via signal path 106. In an embodiment, engine 105 initiates such operation when interface 201 receives a command packet and at least one processor writes to a memory-mapped control register in interface 201. In an embodiment, command packets are provided by a processor, such as CPU 103, writing and transferring values in the form of digital bit values in contiguous fields of a command packet to engine 105. Multiple command packets can be executed in succession by engine 105.

Tables I and II illustrate exemplary command packets having specific exemplary control values in parentheses.

TABLE I

Command Name (Decompress Into Sub-Rectangle)
Source Type (LZ77)            Destination Type (Tiled)
Source Starting Address (0x180000)
Source Byte Count (1640)
Destination Starting Address (0x30000)
Destination Rectangle Width (1024)    Sub-rectangle Width (256)
Sub-rectangle X Offset (0)            Sub-rectangle Y Offset (256)
Destination texel format (block coded RGBA integer)

TABLE II

Command Name (Decompress Into Sub-Rectangle)
Source Type (JPEG)            Destination Type (Tiled)
Source Starting Address (0x180000)
Source Byte Count (1880)
Destination Luma Starting Address (0x40000)
Destination Chroma Starting Address (0x30000)
Destination Luma Rectangle      Luma Sub-rectangle Width (256)
Width (1024)
Sub-rectangle X Offset (0)      Sub-rectangle Y Offset (256)
Destination texel format (RGB 8b fractional)

In an embodiment, each row of the command packet is a successive 32-byte value that may be partitioned into fields. For example as illustrated in Table I, a first row of a command packet may include the "Command Name", such as "Decompress Into Sub-Rectangle" value or command. The second row may indicate a "Source Type, such as how the compressed data is stored, or in this example a "LZ77" compressed format. A "Destination Type" value in the second field of the second row indicates how the decompressed values will be stored in memory. A "Tiled" value indicates the values are stored in memory such that incrementing addresses represent incrementing values of x and y in some small repeating pattern (e.g. a 4×4 tile pattern: (0, 0) (1, 0) (2, 0) (3, 0) (0, 1) (1, 1) (2, 1) (3, 1) (0, 2) . . . (3, 3) (4, 0) (5, 0) (6, 0) . . . (7, 7) . . . ) . . . . Alternatively, a "Linear" value at a "Destination Type" field indicates the values are stored in memory such that incrementing addresses represent incrementing values of x for each entire row of the texture.

Returning to Table I, the third row may indicate a "Source Starting Address" or "0x180000" in the source memory for the compressed texture data. The fourth row may indicate a "Source Byte Count Value," or "1640" that indicates how many bytes of compressed texture data is retrieved starting at the "Source Starting Address" or address 0x180000 in this example. The fifth row indicates a "Destination Starting Address" or "0x30000" address value which indicates where in memory the entire destination texture image starts, used to calculate where engine 105 starts storing or writing the decompressed texture data. The sixth row indicates a size of a "Destination Rectangle Width" and "Sub-Rectangle Width" fields, "1024" and "256" values respectfully in this example. The seventh row indicates "Sub-Rectangle X Offset" and "Sub-Rectangle Y Offset" fields as "0" and "256" values respectively, further used in combination with the Destination Starting Address and other values to determine the exact starting address of the destination sub-rectangle. The eighth row indicates a "Destination Texel Format" such as "block coded RGBA integer" value.

Table II illustrates a command packet for decompressing compressed texture data that is in 4:2:0 JPEG compressed format that results in separate luma and chroma rectangles (or planes). Similar to Table I, rows in a command packet provide control values for an engine 105 to provide decompressed texture data to a destination sub-rectangle address. In this embodiment, separate "Luma" and "Chroma" destination address values are used for the separate "Destination . . . Start Address(es)" of the separate planes.

In another embodiment, a command packet is generated to compress texture data from uncompressed data stored in a tile format. For example, a command would initiate the engine to map and compress a tiled uncompressed texture sub-rectangle image to a LZ77 encoded format (stored in linear fashion in an embodiment) at a particular destination address in memory.

Interface 201 includes registers to receive control information or control signals, data and timing information in embodiments. Interface 201 may include a phase lock loop (PLL) or delay lock loop (DLL) to time the reception and transfer of data and control information as well as engine 105 circuits. In an embodiment, interface 201 is configured to receive control and data from signal path 106. In embodiments, interface 201 includes serial-to-parallel converter circuits as well as parallel-to-serial converter circuits.

Controller 204 receives command addresses, such as a first command address, from interface 201 as will as an initiate signal via signal path 223. In an embodiment, a host processor outputs the command address and initiate signal to engine 105. Controller 204 then requests command buffer 203 to fetch at least one command packet from memory via interface 201. Command buffer 203 receives a command packet from interface 201 via signal path 222. Controller 204 then reads the first command packet from command buffer 204. Controller 204 then orchestrates a continuous sequence of reading compressed texture data from source memory, such as memory 102, and writing decompressed texture data to destination memory, such as memory 102 (texture buffer 109) until the source byte count value in the corresponding command packet is reached.

In particular, read data buffer 202 reads a portion of compressed texture data from source memory via interface 201 and signal path 221. The compressed texture data stored in read data buffer 202 is then output to read formatter 206 via signal path 224. In embodiments, read formatter 206 either de-tiles the read data (converts the data from a tile format) or passes the read data to the selected decoder/ encoder (LZ decoder 207, JPEG decoder 208, LZ encoder 209, JPEG encoder 210) via signal path 225. Controller 204 selects a predetermined decoder/encoder in response to a control signal output from controller 204 based on a received command packet.

In an embodiment, LZ decoder 207 receives compressed LZ77 texture data that has been passed through by read formatter 206 from signal path 225 and outputs decoded or decompressed texture data to write formatter 211 via signal path 226.

Similarly, JPEG decoder 208 receives compressed JPEG texture data that has been passed through by read formatter 206 from signal path 225 and outputs decoded or decompressed texture data to write formatter 211 via signal path 226.

In an embodiment, read formatter 206 de-tiles texture data stored in a tile format in memory and transfers the texture data to either LZ encoder 209 or JPEG encoder 210 to compress the de-tiled texture data into ether LZ77 compressed texture data or JPEG compressed texture data.

In particular, LZ encoder 209 receives texture data via signal path 225 and outputs encoded or LZ77 compressed texture data to write formatter 211 via signal path 226. Similarly, JPEG encoder 210 receives texture data via signal path 225 and outputs encoded or compressed JPEG texture data to write formatter 211 via signal path 226.

Write formatter 211 either passes the data to write data buffer 205 via signal path 227 or formats the data into a tile format in response to control signals from controller 204. Compressed texture data is passed through write formatter 211 while decompressed texture data is formatted into a tile format for storage into memory in an embodiment.

Write data buffer 205 gathers the data received from write formatter 211, such as decompressed texture data, and then writes a portion of the gathered or collected data in write data buffer 205 to a destination sub-rectangle address in memory via signal path 228, interface 201 and signal path 220. In an embodiment, the destination sub-rectangle address is located in texture buffer 109 of memory 102 as illustrated in FIG. 1. In an embodiment, interface 201 generates a control signal to GPU to notify that a decompressed texture has been stored in the texture buffer 109 and may be used for rendering in the next frame of video.

Figure 4:
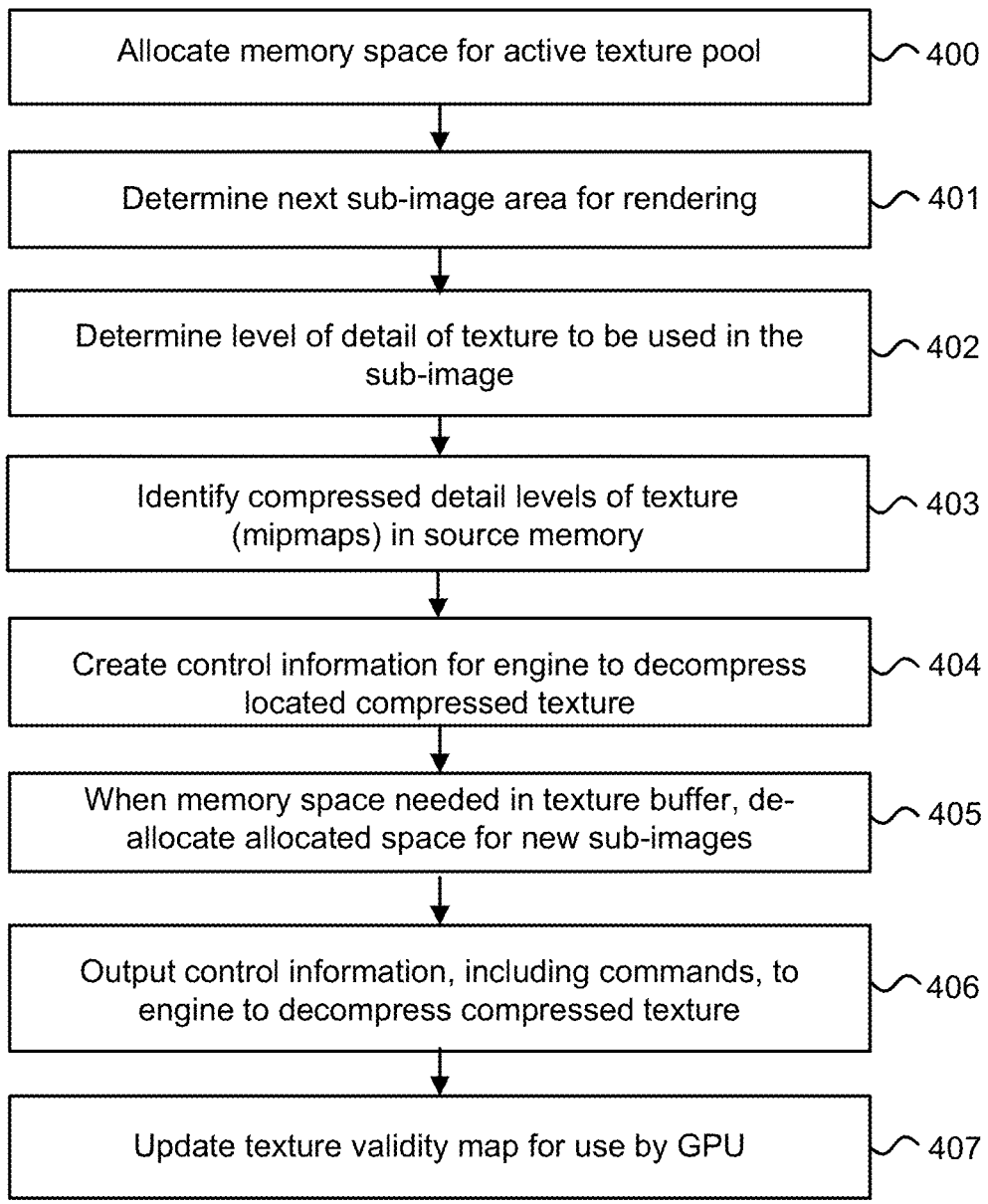
FIG. 4 is a flow chart of decompressing compressed data representing textures and providing the decompressed data representing textures to a texture buffer accessible by a graphics processor for rendering.
Figure 5A:
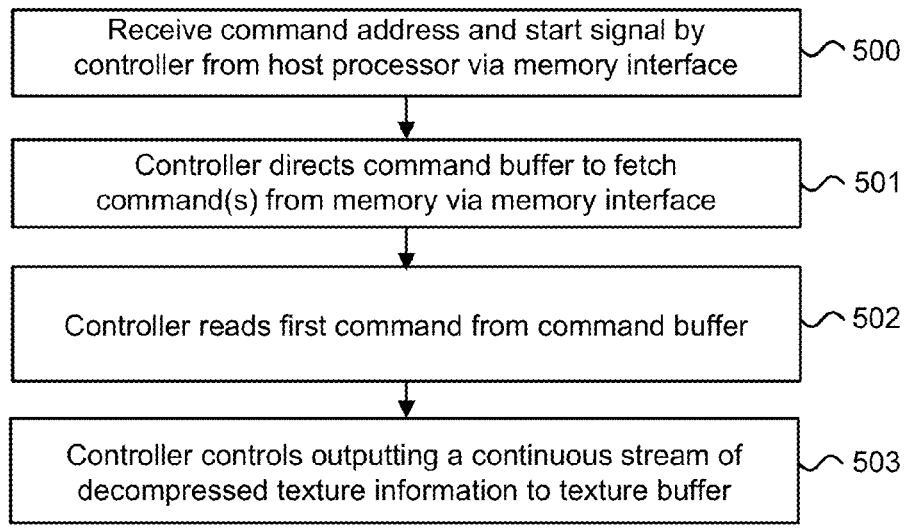
FIGS. 5A-B are flow charts of operating a engine for streaming decompressed textures.
Figure 5B:
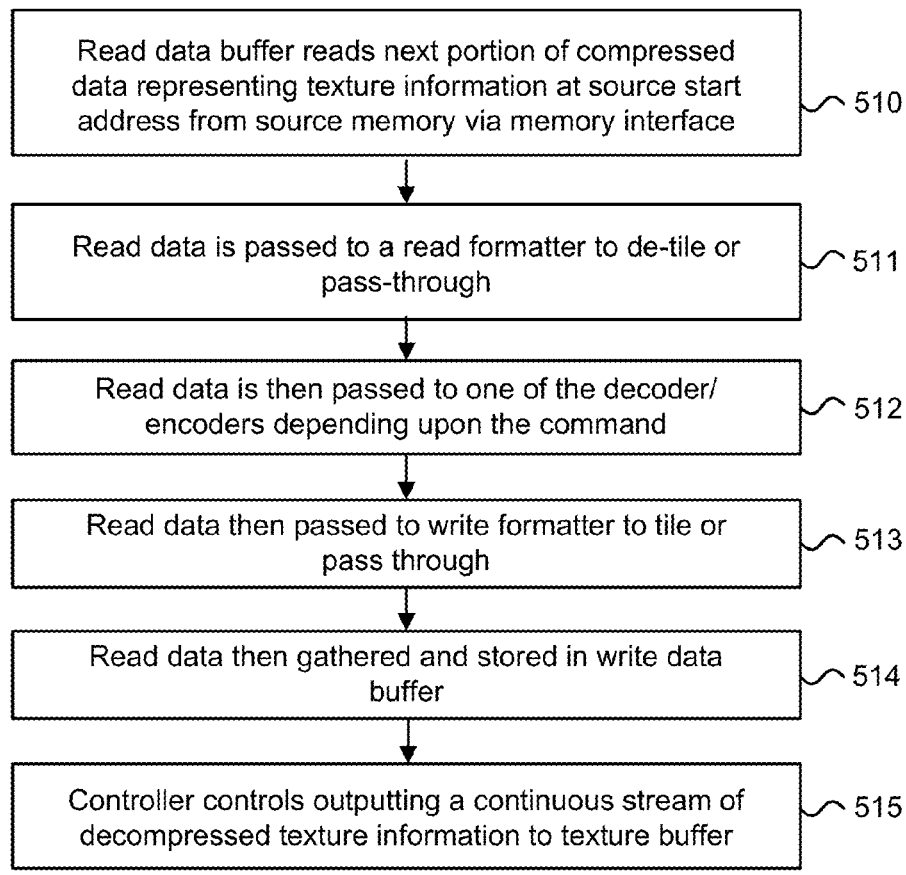

FIGS. 4 and 5A-B are flow charts illustrating exemplary methods of providing a stream of virtual textures from an engine. In embodiments, steps illustrated in FIGS. 4 and 5A-B represent the operation of hardware (e.g., processor, engine, memory, circuits), software (e.g., operating system, applications, drivers, machine/processor executable instructions), or a user, singly or in combination. As one of ordinary skill in the art would understand, embodiments may include less or more steps shown.

FIG. 4 is a flow chart of decompressing compressed data representing textures and providing the decompressed data representing textures to a texture buffer accessible by a graphics processor for rendering.

Step 400 illustrates allocating memory space, such as texture buffer 109 in memory 102, for an active texture pool to be used in rendering. In an embodiment, application 107 executed by at least one processor performs this function. In an embodiment, application 107 communicates with the appropriate driver to allocate the memory for the active texture pool depending upon the current scene and/or geometry to be rendered.

Step 401 illustrates determining the next sub-image area of a scene or CGI that will be rendered or updated. For example, a CGI may have just a portion or sub-image that needs to be updated with a texture as opposed to the entire CGI or scene. In an embodiment, application 107 executed by at least one processor performs this function.

Step 402 illustrates determining the level of detail of the texture that will be used in the sub-image. For example, an appropriate Mip level of the texture's Mipmap is determined. In an embodiment, application 107 executed by at least one processor performs this function.

Step 403 illustrates identifying where the compressed detail levels of texture (mipmaps) are located in source memory. For example, an address to compressed textures 108 is identified by the application in an embodiment.

Control information is then created as illustrated by step 404. Control information, such as command packets including commands, are created by an application so that they may be transferred to an engine to provide a stream of decompressed textures to a texture buffer in an embodiment as illustrated in step 406.

Step 405 illustrates allocating more memory for an active texture pool when further sub-images are updated. In an embodiment, application 107 executed by at least one processor performs the functions illustrated by steps 404-407.

Step 407 illustrates updating a texture validity map that is accessible by a GPU, such as GPU 104.

FIGS. 5A-B are flow charts of operating a engine, such as engine 105, for streaming decompressed virtual textures. Step 500 illustrates an engine, in particular a controller of the engine, receiving a start address to a command and a start or control signal, from for example a host processor, to initiate decompression of the compressed texture information.

Step 501 illustrates the controller directing a command buffer to fetch the at least one command at the start address.

Step 502 illustrates the controller reading the first command from the command buffer; while, step 503 illustrates the controller providing a continuous stream of decompressed texture data or information to a texture buffer. In an embodiment, step 502 also illustrates receiving a start address of a compressed texture information and a destination address of a sub-image that may be stored in a control packet. Step 503 also illustrates decompressing the compressed texture information to provide texture information as well as output the texture information to the destination address of the sub-image.

In an alternate method embodiment, a sub-image of uncompressed texture information that is stored in processor readable memory is compressed. In an embodiment, engine 105 performs the steps of this compression method. A control signal to initiate compression of the uncompressed texture information and a start address of the uncompressed texture information is received, similar to step 500 above. A sub-image of the uncompressed texture information is compressed to have a compressed sub-image texture. In an embodiment, LZ encoder 209 or JPEG encoder 210 in engine 105 perform this compression step. A destination address to store the compressed sub-image texture is received and the compressed sub-image texture is output to the destination address. In an embodiment, engine 105 also performs this receiving and outputting step.

In an embodiment, FIG. 5B illustrates the steps for providing the stream of decompressed textures illustrated by step 503 in FIG. 5A. In an embodiment, step 503 or steps 510-515 are repeated in a looped manner. Step 510 illustrates a data buffer reading a next portion of compressed data representing texture information at a source address. In an embodiment, read data buffer 202 performs this function.

Step 511 illustrates read data passed to a read formatter for de-tile or pass-through the read data.

Step 512 illustrates decoding or encoding the read data, which may be compressed or decompressed texture data. In an embodiment, decoders 207/208 and encoders 209/210 perform this function.

Step 513 illustrates passing the write data to a write formatter to format the write data in a tile format or pass-through the write data, such as decompressed texture data.

Step 514 illustrates gathering the read data in a write data buffer and step 515 illustrates storing the write data, such as decompressed texture data, at destination addresses in a texture buffer, or active texture pool, accessible by a GPU for rendering in an embodiment.

Figure 6:
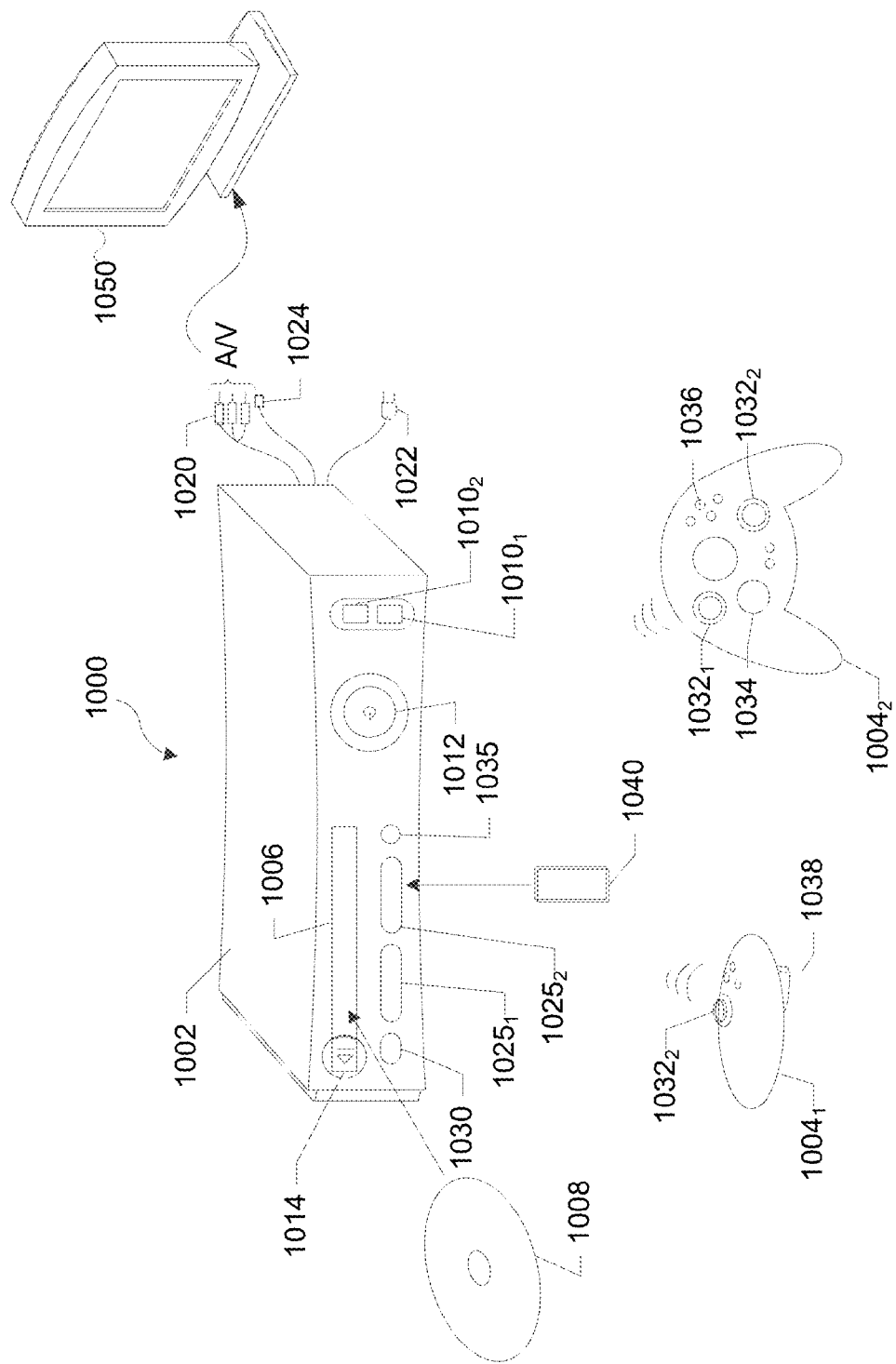
FIG. 6 is an isometric view of an exemplary gaming and media system.

In an embodiment, at least one of the computing devices 100 may be, but is not limited to, a video game and/or media console. FIG. 6 will now be used to describe an exemplary video game and media console, or more generally, will be used to describe an exemplary gaming and media system 1000 that includes a game and media console. The following discussion of FIG. 6 is intended to provide a brief, general description of a suitable computing device with which concepts presented herein may be implemented. It is understood that the system of FIG. 6 is by way of example only. In further examples, embodiments describe herein may be implemented using a variety of client computing devices, either via a browser application or a software application resident on and executed by the client computing device. As shown in FIG. 6, a gaming and media system 1000 includes a game and media console (hereinafter "console") 1002. In general, the console 1002 is one type of client computing device. The console 1002 is configured to accommodate at least one wireless controller, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 6, the console 1002 also includes an optical port 1030 for communicating wirelessly with at least one device and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the game console. The console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 6, each controller 1004 is equipped with two thumb sticks $1032_1$ and $1032_2$, a D-pad 1034, buttons 1036, and two triggers 1038. These controllers are merely representative, and other known gaming controllers may be substituted for, or added to, those shown in FIG. 6. In an embodiment, a user may enter input to console 1002 by way of gesture, touch or voice. In an embodiment, optical I/O interface 1135 receives and translates gestures of a user. In another embodiment, console 1002 includes a natural user interface (NUI) to receive and translate voice and gesture inputs from a user. In an alternate embodiment, front panel subassembly 1142 includes a touch surface and a microphone for receiving and translating a touch or voice, such as a voice command, of a user.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games (such as video games) stored on a memory medium, as well as for downloading and playing games, and reproducing pre-recorded music and videos, from both electronic and hard media sources. With the different storage offerings, titles can be played from the hard disk drive, from an optical disk media (e.g., an optical storage disc 1008), from an online source, or from MU 1040. Samples of the types of media that gaming and media system 1000 is capable of playing include:

Game titles played from CD and DVD discs, from the hard disk drive, or from an online source.

Digital music played from a CD in portable media drive 1006, from a file on the hard disk drive (e.g., music in a media format), or from online streaming sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select a game using the controller 1004 and display state solvability information as discussed below.

Figure 7:
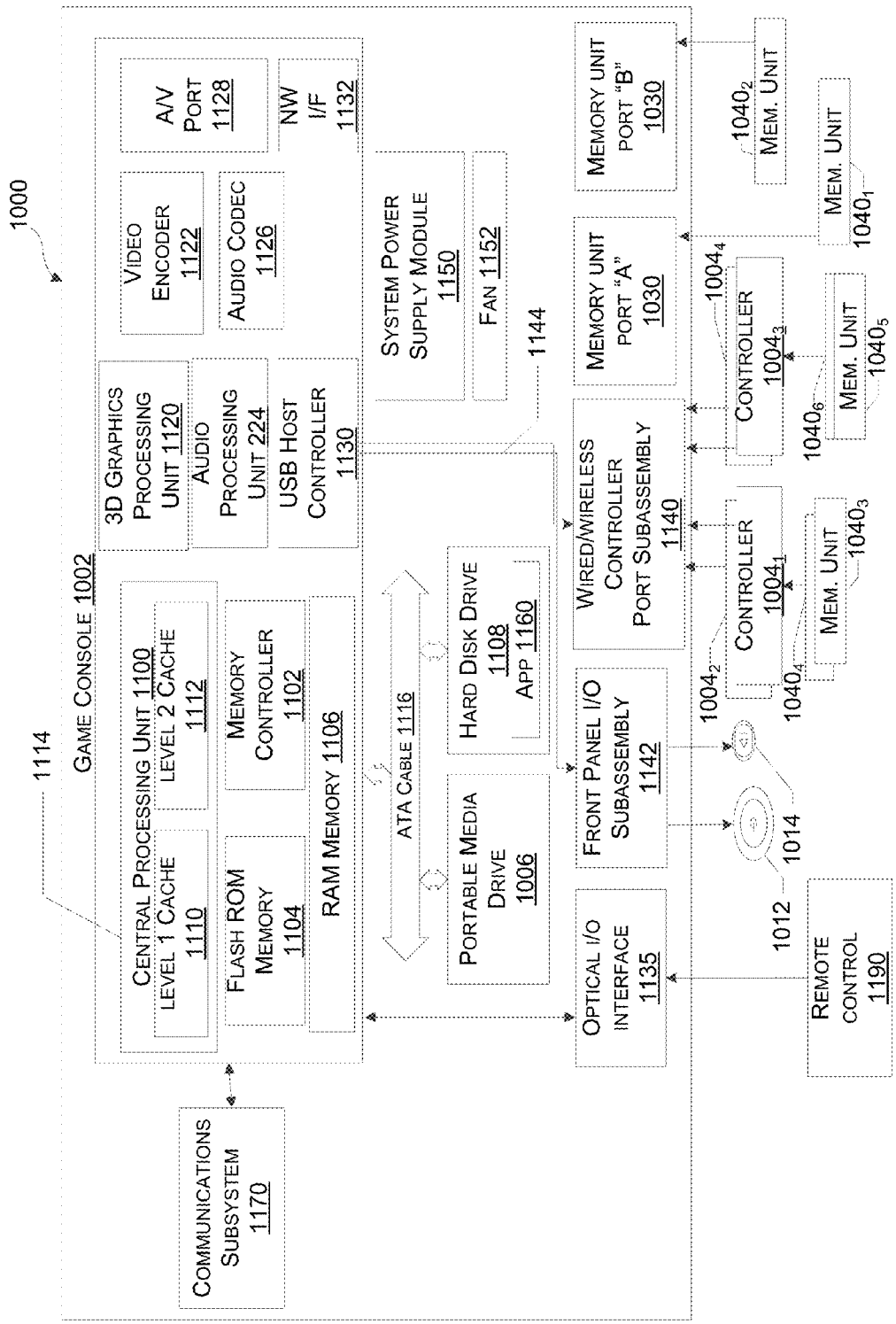
FIG. 7 is an exemplary functional block diagram of components of the gaming and media system.

FIG. 7 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive 1108, and the portable media drive 1006. In one implementation, the CPU 1100 includes a level 1 cache 1110 and a level 2 cache 1112, to temporarily store data and hence reduce the number of memory access cycles made to the hard drive 1108, thereby improving processing speed and throughput. In an embodiment, CPU 1100 and memory controller 1102 correspond to CPU 103 and engine 105 while RAM 1106 corresponds to memory 102 in embodiments.

The CPU 1100, the memory controller 1102, and various memory devices are interconnected via at least one bus. The details of the bus that is used in this implementation are not particularly relevant to understanding the subject matter of interest being discussed herein. However, it will be understood that such a bus might include at least one of a serial bus, parallel bus, memory bus, peripheral bus, and processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display. In the illustrated implementation, the video and audio processing components 1120-1128 are mounted on the module 1114.

In another embodiment, at least CPU 1100, level 1 cache 1110, level 2 cache 1112, memory controller 1102 and RAM memory 1106 along with a engine 105 are included in a SoC, such as SoC 101 as described herein and shown in FIG. 1. In an embodiment, RAM memory 1106 is replaced with memory 102 and CPU 103 performs the function of memory controller 1102. In an embodiment, application 107 (such as a video game or gaming application), compressed textures 108 and decompressed textures 109*a/b* in texture buffer 109 are included in memory 102 that replaces RAM memory 1106.

FIG. 7 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers 1004₁-1004₄. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, the console 1002 includes a controller support subassembly 1140 for supporting the four controllers 1004₁-1004₄. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via at least one cable assembly 1144. In other implementations, the console 1002 can include additional controller subassemblies. The illustrated implementation also shows an optical I/O interface 1135 that is configured to send and receive signals that can be communicated to the module 1114.

The MUs 1040₁ and 1040₂ are illustrated as being connectable to MU ports "A" 1030₁ and "B" 1030₂ respectively. Additional MUs (e.g., MUs 1040₃-1040₆) are illustrated as being connectable to the controllers 1004₁ and 1004₃, i.e., two MUs for each controller. The controllers 1004₂ and 1004₄ can also be configured to receive MUs. Each MU 1040 offers additional storage on which games, game parameters, and other data may be stored. In some implementations, the other data can include any of a digital game component, an executable gaming application, an instruction set for expanding a gaming application, and a media file. When inserted into the console 1002 or a controller, the memory controller 1102 can access the MU 1040.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100. In an embodiment, application 1160 is replace with application 107 as described herein.

The console 1002 is also shown as including a communication subsystem 1170 configured to communicatively couple the console 1002 with at least one other computing device (e.g., other console). The communication subsystem 1170 may include wired and/or wireless communication devices compatible with at least one different communication protocol. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to display 1050 (FIG. 6), a television, a video projector, or other display device. In this standalone mode, the gaming and media system 1000 enables at least one player to play games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of the computing devices 100 discussed above with reference to FIG. 1 and various other Figures. As was explained above, there are various other types of computing devices with which embodiments described herein can be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method of operating an engine to decompress compressed texture information stored in at least one processor readable memory, the method comprising:
   receiving a control signal to initiate decompression of the compressed texture information, the compressed texture information provided to modify a sub-portion of a graphical image;
   receiving a start address of the compressed texture information in the at least one processor readable memory;
   receiving a destination address of a sub-image;
   decompressing the compressed texture information in response to control information in the form of at least one command to provide texture information, and writing at least a portion of the decompressed texture information to different sized regions within two texture images of the destination address as a sub-rectangle address of a larger rectangle address of the at least one processor readable memory, the sub-rectangle address having a smaller width than the larger rectangle address width; and
   outputting the texture information to the destination address of the sub-image.

2. The method of claim 1, wherein the decompressing the encoding texture information includes:
   reading a first portion of the compressed texture information at the start address;
   decoding the first portion of the compressed texture information to obtain a first portion of texture information; and
   storing the first portion of the texture information in a texture buffer of the engine at the sub-rectangle address.

3. The method of claim 2, further comprising:
   reading a second portion of the compressed texture information of the compressed texture information;
   decoding the second portion of the compressed texture information to obtain a second portion of texture information; and
   storing the second portion of the texture information in the texture buffer at the sub-rectangle address; and
   wherein the outputting includes writing the first and second portions of the texture information to the destination address of the sub-image.

4. The method of claim 3, wherein the decoding includes using one of a JPEG decoder and LZ decoder to decode the compressed texture information.

5. The method of claim 3, wherein the destination address of the sub-image represents a portion of a texture image used to render a computer generated image that is to be updated in a next frame of a video.

6. The method of claim 1, wherein the method also compresses a sub-image of uncompressed texture information stored in the at least one processor readable memory, the method comprising:
   receiving a control signal to initiate compression of the uncompressed texture information;
   receiving a start address of the uncompressed texture information stored in the at least one processor readable memory;
   compressing the sub-image of the uncompressed texture information to provide a compressed sub-image texture;
   receiving a destination address to store the compressed sub-image texture, and
   outputting the compressed sub-image texture to the destination address.

7. The method of claim 1, wherein the compressed texture information is selected from one of compressed JPEG texture data and compressed LZ77 texture data, and wherein the engine includes an integrated circuit having a controller and decoder, and wherein the at least one processor readable memory includes volatile integrated circuit memory.

8. The method of claim 1, wherein the destination address of the sub-image includes a start rectangle address, a sub-rectangle width and Y offset.

9. An apparatus comprising:
   an application having processor readable instructions;
   at least one processor configured to execute the processor readable instructions to modify a sub-portion of a computer generated image using a texture image having a plurality of sub-images;
   at least one processor readable memory that stores compressed data representing texture of at least a first sub-image in the plurality of sub-images;
   a circuit, operable by the at least one processor, configured to receive at least one command and at least one associated control value to decompress the compressed data at associated source addresses representing texture and stores a stream of the decompressed data representing texture in the at least one processor readable memory at a selected sub-rectangle address, as a tile pattern where incrementing addresses represent incrementing values of x and y in a repeating pattern, so that the at least one processor uses the decompressed data representing texture to update the first sub-image in the plurality of sub-images.

10. The apparatus of claim 9, wherein the first sub-image is used in rendering the computer generated image in a frame.

11. The apparatus of claim 10, wherein the application is a video game software program and the apparatus is a video game console.

12. The apparatus of claim 9, wherein the at least one processor includes a graphics processor unit (GPU) and the at least one processor readable memory includes a random access memory (RAM) having a portion for a texture buffer to store the decompressed data representing texture, and wherein the GPU accesses the texture buffer to render the computer generated image using the first sub-image.

13. The apparatus of claim 12, wherein the GPU and RAM are included in a system on a chip (SoC).

14. The apparatus of claim 12, wherein the circuit includes a controller circuit and a decoder circuit to decode the compressed data representing texture that is selected from one of JPEG compressed data and lossless (Lempel-Ziv (LZ)) compressed data.

15. The apparatus of claim 12, wherein the first sub-image is a sub-rectangle image having a destination address that is received by the circuit.

16. At least one processor readable memory having instructions encoded thereon which when executed cause at least one processor to perform a method for decompressing compressed texture data, the method comprising:
    allocating memory for a virtual texture, the virtual texture provided for updating a sub-image comprising a sub-portion of an image;
    determining an area of the sub-image of the texture;
    determining a level of detail of the sub-image of the virtual texture;
    identify a memory location of a compressed texture data having the level of detail of the sub-image of the virtual texture; and
    transferring control information in a form of a control packet including at least one command, where the control information is provided in successive fields in the control packet, to an engine to decompress the compressed texture data at the memory location and providing a stream of decompressed texture data to a sub-rectangle destination address, where luma and chroma destination address values respectively separate the destination and start addresses of separate luma and chroma rectangles, so that the decompressed texture data may be used to update the sub-image of the virtual texture that is used to render a computer generated image.

17. The at least one processor readable memory of claim 16, further comprising transferring the decompressed texture data to a texture buffer accessible by a graphics processor in the at least one processor that renders the computer generated image.

18. The at least one processor readable memory of claim 16, wherein the sub-image is a sub-rectangle of the texture used to render the computer generated image.

19. The at least one processor readable memory of claim 18, wherein the instructions encoded include instructions of a video game that provides the computer generate image.

20. The at least one processor readable memory of claim 19, wherein the engine includes an integrated circuit controller and decoder to decompress the compressed texture data in response to the at least one command.

* * * * *